Oct. 13, 1931.   F. C. LAMB   1,827,720
MOTOR VEHICLE BRAKE
Filed June 2, 1924
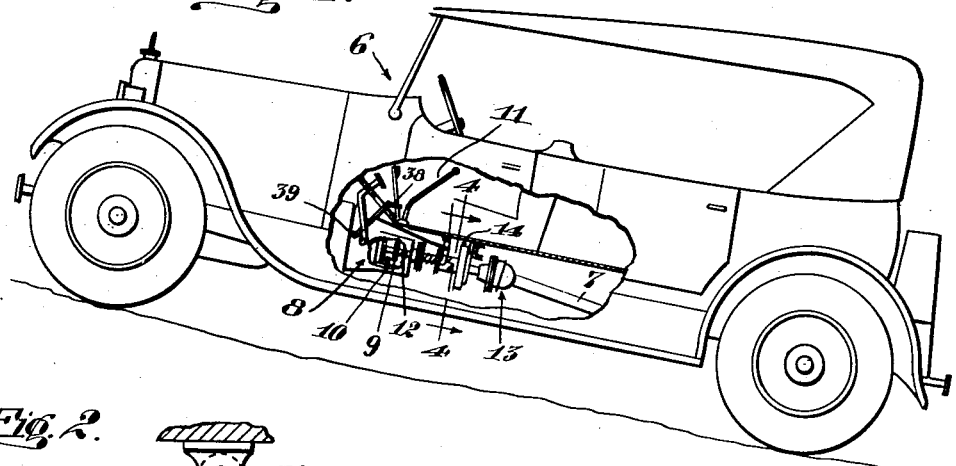
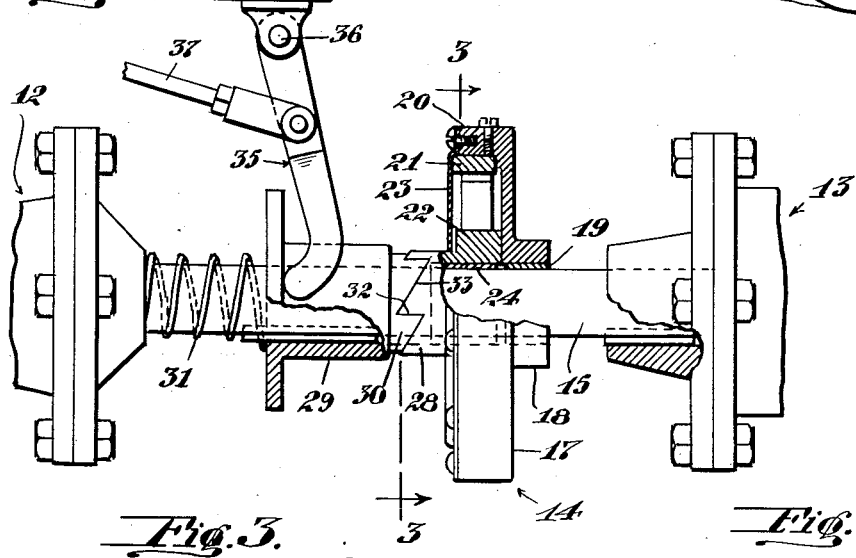
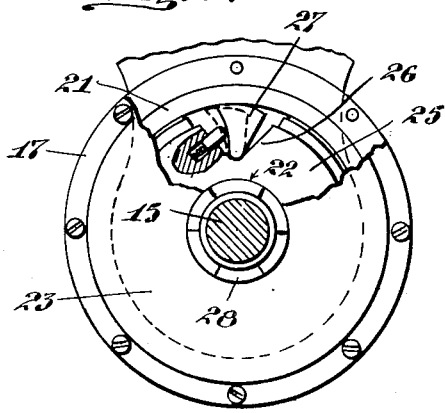
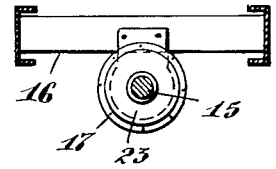
Inventor
Frank C. Lamb;
By R. S. Berry
Attorney Patented Oct. 13, 1931

1,827,720

UNITED STATES PATENT OFFICE

FRANK C. LAMB, OF LOS ANGELES, CALIFORNIA

MOTOR VEHICLE BRAKE

Application filed June 2, 1924. Serial No. 717,276.

This invention particularly pertains to a device for automatically inhibiting undesired or accidental reverse movement of a motor vehicle, and especially relates to a mechanism which is adapted to be associated with the propeller shaft or other suitable part of the driving gear of a power propelled vehicle for limiting the travel of the vehicle to one direction.

An object of the invention is to provide a mechanism of the above character which is simple in construction and dependable in operation, and which will not interfere with the propulsion of the vehicle in a forward direction but will effectually prevent rearward movement thereof at all times except when the reversing mechanism of the vehicle is in operation.

Another object is to provide a reverse arresting mechanism for motor vehicles which is adapted to be automatically operated to permit reverse movement of the vehicle when the reversing mechanism of the latter is placed in operation.

With the foregoing objects in view together with such other objects and advantages as may subsequently appear, the invention resides in the parts and in the construction, combination and arrangement of parts or their equivalents described in the following specification, set forth in the appended claims, and illustrated by way of example in the accompanying drawings, in which—

Figure 1 is a view in side elevation of a motor vehicle with portions broken away and showing the application of the invention.

Figure 2 is a view in side elevation partly in vertical section of the reverse arresting mechanism.

Figure 3 is a view in section and elevation as seen on the line 3—3 of Figure 2.

Figure 4 is an enlarged detail in section and elevation as seen on the line 4—4 of Figure 1.

Referring to the drawings more specifically, 6 indicates a motor vehicle which may be of any suitable type, and which is fitted with a propeller shaft 7 through which motion is transmitted from a source of power on the vehicle to the driving or traction wheels of the latter, as is common in motor vehicle construction. The vehicle is fitted with the usual transmission gearing, indicated at 8, which embodies a reverse gear 9 adapted to be thrown in and out of engagement with a driving pinion 10 as is well known, the reverse gear being shifted by means of a hand lever 11. The reverse gear is splined on a gear shaft 12 that is ordinarily connected to the propeller shaft by means of a universal joint 13. In the embodiment of my invention here illustrated a reverse arresting device 14 is interposed between the gear shaft 12 and the propeller shaft 7 and is so constructed and mounted as to serve to immediately inhibit reverse rotation of the propeller shaft under rotative effort imparted thereto from the traction wheels at any time, such as would ordinarily be occasioned by backward movement of the vehicle when facing upward on a grade with the transmission gear mechanism in neutral, or by retrograde movement of the vehicle when the transmission mechanism is in gear with the motor power cut off as might occur when stalling the motor of the vehicle.

The reverse arresting device is here shown as including a short length of shaft 15 one end of which is affixed to the gear-shaft 12 and the other end of which is secured to one side of the universal joint 13 in such manner that on rotation of the gear shaft in either direction a corresponding motion will be imparted to the propeller shaft.

Rigidly mounted on a transverse frame member 16 of the vehicle chassis is a housing 17 embodying a hub 18 through which the shaft 15 extends; there being a bushing 19 interposed between the hub and the shaft. This housing and hub form a bearing for the outer end portion of the shaft in which the latter rotates.

The housing is provided with an annular flange 20 carrying on its inner periphery a fixed annulus 21 which constitutes a stationary brake member. Encompassing the shaft is a sleeve 22 one end of which is disposed within the housing and the other end of which extends through an opening in a face plate 23 on the housing; this sleeve constituting an element of a movable brake member which is adapted to cooperate with the stationary brake member as will be later described. The shaft 15 is free to rotate within the sleeve 22 and accordingly a bushing 24 is interposed between the shaft and sleeve to take the wear.

The inner end of the sleeve within the housing is formed with a flange 25 having a plurality of V-shaped peripheral recesses 26 in each of which seats a spring pressed dog 27 adapted on rotation of the sleeve 22 in one direction to ride freely over the inner periphery of the annulus 21 but on slight turning of the sleeve 22 in a reverse direction to effect a wedged or frictional engagement with the fixed annulus and thereby inhibit reverse rotation of the sleeve. The sleeve 22 is thus free to rotate in only one direction and is adapted to be automatically locked against rotation in the other direction.

Formed on the outer end of the sleeve 22 is a series of ratchet teeth 28 and splined on the shaft 15 is a sleeve 29 having end teeth 30 adapted to engage the teeth 28; a spiral spring 31 encircling the shaft and exerting a yieldable end thrust on the sleeve to normally maintain the teeth 28 and 30 in interengagement. The teeth 28 and 30 are each formed with faces constituting shoulders 32 extending in the direction of the length of the shaft and have correspondingly inclined end faces 33; the end faces on the teeth 28 being adapted to seat against the end faces of the teeth 30 with the shoulders on the teeth 28 extending parallel to and abutting against the shoulders of the teeth 30 when the teeth are engaged, so that turning of the shaft 15 and the sleeve 29 in a reverse direction will be prevented by reason of the brake members retaining the sleeve 22 against reverse rotation until the sleeve 29 is moved out of engagement with the sleeve 22. The frictional engagement of the inclined end faces of the teeth 28 and 30 under the action of the springs 31 is sufficient to cause the brake sleeve 22 to rotate in a forward direction on corresponding rotation of the splined sleeve 29. By inclining the end faces of the teeth they are adapted to readily move in and out of their engaged position.

Means are provided for shifting the splined sleeve 29 out of connection with the brake sleeve 22 which is preferably controlled by operation of the hand lever 11 in moving the latter to dispose the transmission gear mechanism in reverse, and which means is here shown as embodying a yoke 35 which extends astride the splined sleeve and has its outer end pivoted to the vehicle frame or any other suitable support as indicated at 36. A connecting rod 37 leads from the yoke to any suitable device whereby a pull may be exerted thereon on moving the lever 11 into the reverse position which is here shown as comprising an arm 38 pivoted at 39 and arranged with its upper end disposed in the path of travel of the hand lever 11 as the latter is moved to throw the reverse mechanism in the transmission into operation.

In the operation of the invention the sleeves 29 and 22 are normally interconnected as shown in Figure 2, and the dogs 27 in the clutch are positioned to freely traverse the annulus 21. On rotation of the shaft 15 in a forward direction either through the medium of the motive power employed to propel the vehicle or through the rotation of the propeller shaft from the drive wheels of the vehicle as in coasting forwardly, the sleeves 29 and 22 will be caused to rotate; the latter turning freely within the housing. In event that reverse rotative effort is imparted to the shaft 15 at any time from the traction wheels while the splined sleeve 29 and the brake sleeve are connected together, reverse rotation of the shaft 15, propeller shaft 7, and the traction wheels will be immediately prevented by reason of the dogs 27 moving into locking engagement with the fixed annulus 21 on slight retrograde movement of the brake sleeve 22 which holds the sleeve 22 against turning backward. This action will occur whether the transmission gear mechanism is in neutral or is in forward gear, thus serving to inhibit retrograde movement of the vehicle at all times.

When it is desired to reverse the vehicle the operating lever 11 is moved to place the transmission gears in reverse, which is effected by moving the operating lever 11 forwardly as is common in transmission gear shift operations; the forward movement of the lever 11 operating to rock the arm 38 forwardly on its pivot 39 and thereby exert a pull on the rod 37 to swing the yoke 35 forwardly, whereupon the splined sleeve will be moved out of engagement with the brake sleeve thereby permitting reverse rotation of the propeller shaft.

While I have shown the reverse arresting mechanism 14 as arranged externally of the transmission gear case, it may obviously be disposed within the gear case in some instances, and while I have shown and described a specific embodiment of the invention I do not limit myself to the exact details of construction shown but may employ such changes in the parts and in the construction, arrangement, and modifications of the parts as come within the scope of the appended claims without departing from the spirit of the invention as herein set forth.

I claim:—

1. In a motor vehicle having a transmission mechanism and traction wheels, a shaft interposed between said transmission mechanism and wheels and rotatable by power applied through either the transmission mechanism or wheels, said shaft being rotatable directly from said mechanism, a brake member carried by said shaft and turnable freely therewith in one direction, and a stationary brake member adapted to cooperate with said movable brake member to immediately inhibit reverse rotation of said shaft at all times on reverse rotative effort being applied thereto through said traction wheels, and means whereby the movable brake member may be placed out of cooperative relation with the shaft to permit reverse rotation of the shaft.

2. In a motor vehicle having a transmission mechanism and traction wheels, a shaft interposed between said transmission mechanism and wheels and rotatable by power applied through either the transmission mechanism or wheels, said shaft being rotatable directly from said mechanism, a brake member carried by said shaft and turnable freely therewith in one direction, a stationary brake member arranged to cooperate with said movable brake member to immediately inhibit reverse rotation of said shaft at all times on reverse rotative effort being applied thereto through said traction wheels, means whereby the movable brake member may be placed out of co-operative relation with the shaft to permit reverse rotation of the shaft, and means whereby said last named means will be operated on disposing the transmission mechanism in reverse.

3. In a motor vehicle, a transmission mechanism, a shaft rotatable in either direction thereby, a sleeve splined on said shaft, a sleeve loose on said shaft, means for normally maintaining said sleeves in interconnection, means operable to effect disengagement of the sleeves, a fixed member adjacent said loose sleeve, and means operable to effect connection between said fixed member and said loose sleeve on reverse rotative movement of the latter adapted to permit free rotary movement of said loose sleeve in a forward direction.

4. In a motor vehicle, a transmission mechanism, a shaft rotatable in either direction thereby, a sleeve splined on said shaft, a sleeve loose on said shaft, means for normally maintaining said sleeves in interconnection, a fixed member adjacent said loose sleeve, means operable to effect connection between said fixed member and said loose sleeve on reverse rotative movement of the latter adapted to permit free rotary movement of said loose sleeve in a forward direction, and means for effecting disconnection of said sleeves on disposing the transmission mechanism in reverse.

5. In a motor vehicle, a transmission mechanism, a shaft rotatable in either direction thereby, a sleeve encompassing said shaft in which the shaft may turn in either direction, a fixed member, means for effecting connection between said sleeve and fixed member to limit turning of said sleeve to a forward direction, a sleeve splined on said shaft to turn therewith, ratchet teeth on each of said sleeves, a spring bearing on said splined sleeve normally maintaining the ratchet teeth of the sleeves interconnected, and means for shifting said splined sleeve to effect disengagement of said ratchet teeth.

6. A device for preventing backward movement of motor vehicles comprising a one way brake adapted for association with the drive shaft of the vehicle, said one way brake including inner and outer members, the inner member of the brake being adapted to be freely disposed upon the drive shaft and having a member of a positive clutch rigid therewith, and a second member of said positive clutch provided with means for slidably keying the same to said drive shaft.

7. A device for preventing backward movement of motor vehicles comprising a one way brake adapted for association with the drive shaft of the vehicle, said one way brake including inner and outer members, the inner member of the brake being adapted to be freely disposed upon the drive shaft and having a member of a positive clutch rigid therewith, and a second member of said positive clutch provided with means for slidably keying the same to said drive shaft, means to manually release said last named positive clutch member, and yieldable means to normally hold said last named positive clutch member in engaged position.

FRANK C. LAMB.